June 25, 1957 R. F. STOLL 2,796,768
POWER OPERATED ELLIPTICAL MOTION TOOL
Filed April 4, 1956 2 Sheets-Sheet 1

INVENTOR.
Russell F. Stoll
BY
D. Emmett Thompson
Attorney.

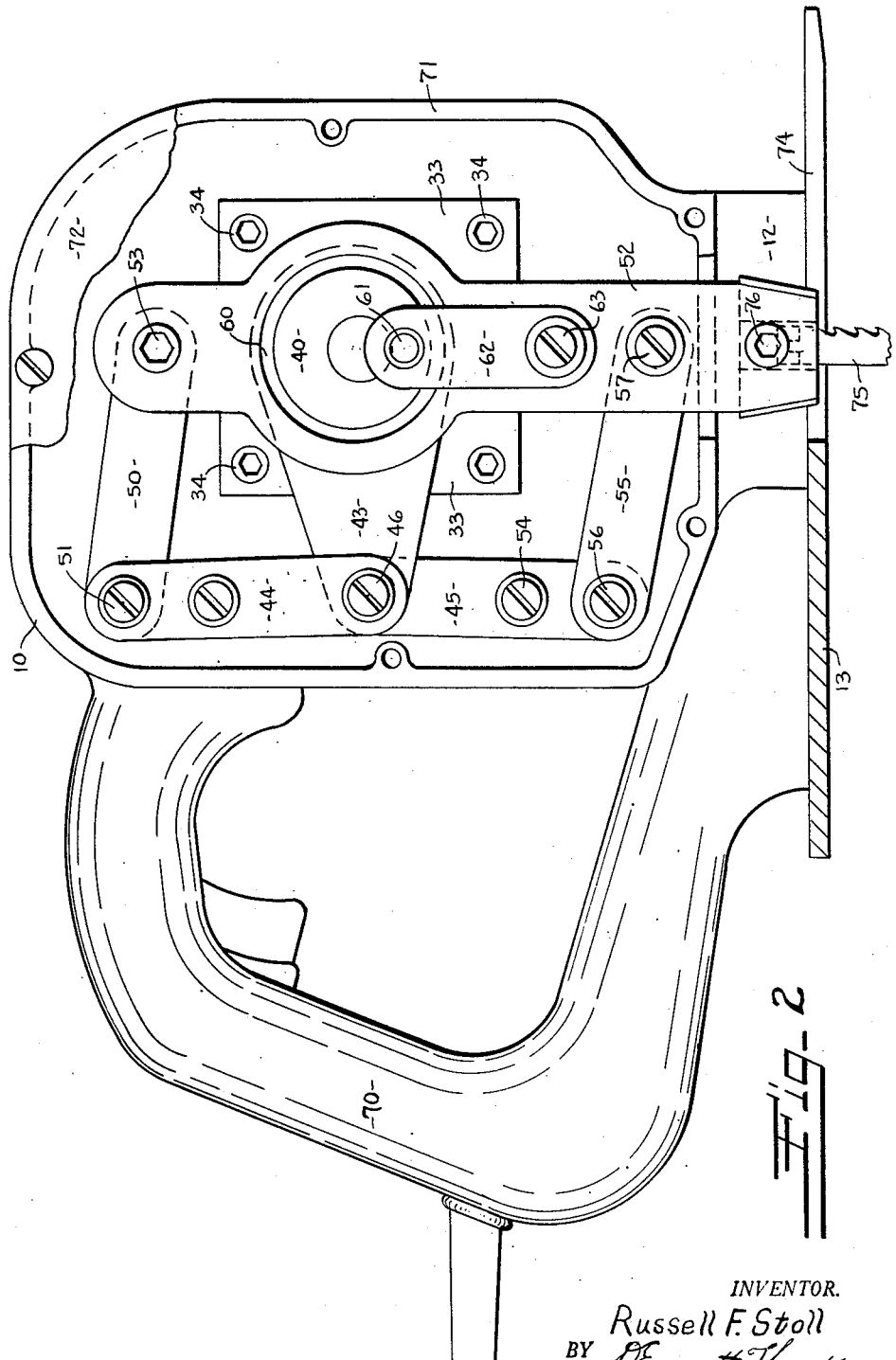

2,796,768
POWER OPERATED ELLIPTICAL MOTION TOOL

Russell F. Stoll, North Syracuse, N. Y., assignor to The Porter-Cable Machine Company, Syracuse, N. Y., a corporation of New York Application April 4, 1956, Serial No. 575,987

3 Claims. (Cl. 74—43)

This invention relates to power operated elliptical motion tools, such as sawing machines. More particularly, the invention has to do with the mechanism for producing the elliptical motion imparted to the tool character.

This invention has as an object a power operated elliptical motion tool embodying a mechanism for imparting elliptical motion to the tool carrier, the mechanism being economical to manufacture and operating with a minimum of friction losses.

The invention consists in the novel features and in the combinations and constructions hereinafter set forth and claimed.

In describing this invention, reference is had to the accompanying drawings in which like characters designate corresponding parts in all the views.

In the drawings—

Figure 2 is an end elevational view looking to the right Figure 1, with the closure plate being broken away.

Figure 1:
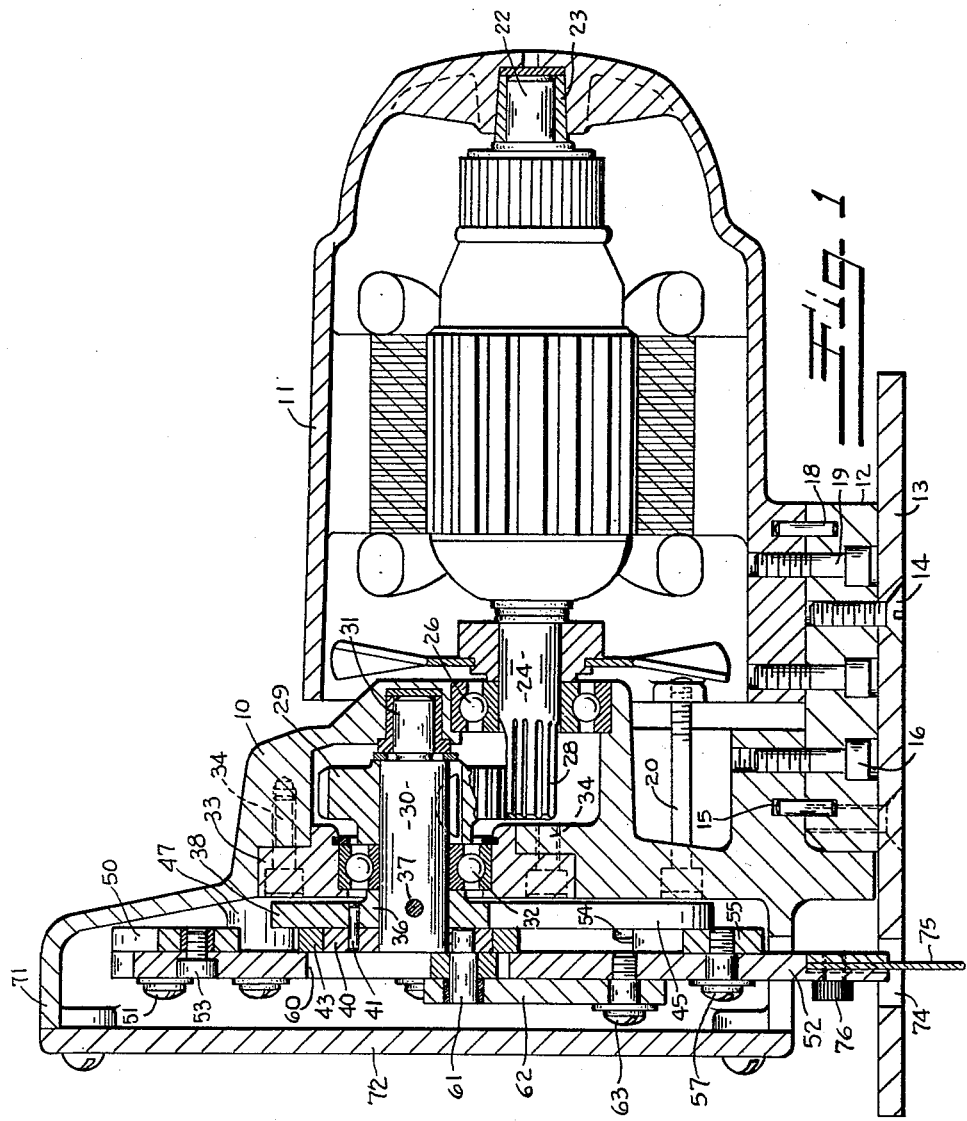
Figure 1 is a lengthwise sectional view of an elliptical motion tool embodying my invention.

The machine consists of a casing including a gear housing 10 and a motor housing 11. These housings are mounted upon a block 12 secured to a base plate 13, as by screws 14. The gear housing 10 is affixed to the block 12 by means of dowel pins 15, screws 16. The motor housing is affixed to the block by dowel pins 18, screws 19. The gear housing and motor housing are also secured together as by screws 20.

A motor is mounted in the housing 11 with the outer end 22 of its armature shaft journalled in a bearing 23, positioned in the outer end wall of the motor housing, and the inner end portion 24 of the armature shaft is journalled in an antifriction bearing 26 mounted in the gear housing 10. The end portion of the armature shaft is formed with a pinion 28 arranged in mesh with a gear 29 fixedly secured to a shaft 30. The inner end of this shaft is journalled in a bearing 31 mounted in the gear housing, and the outer portion of the shaft is journalled in an antifriction bearing 32 mounted in a cap 33 fixed to the gear housing as by screws 34. A collar 36 is fixed to the shaft 30, as by pin 37, and is formed with a counterweight portion 38.

An eccentric 40 is mounted on the outer end of the shaft 30 and is connected to the collar 36 as by pin 41. A link 43 is mounted on the eccentric 40 and is pivotally connected at its free end to adjacent ends of links 44, 45, as by screw 46. The adjacent ends of links 44, 45, are provided with slots for pivot screw 46 to avoid any binding due to movement of the links about their fixed pivots. The link 44 is pivotally mounted intermediate its ends on a boss 47 formed integral with the gear housing 10. The upper or opposite end of the link 44 is pivotally connected to a link 50, as by screw 51. The opposite end of the link 50 is pivotally connected to the upper end of a tool carrier 52, as by screw 53.

The link 45 is pivotally mounted intermediate its ends on a fixed pivot 54 carried by the gear housing 10. The lower end of the link 45 is pivotally connected to a link 55 as by screw 56, and the opposite end of the link 55 is pivotally connected to the lower portion of the tool holder 52, as by screw 57. The intermediate portion of the tool holder carrier is formed with a circular bore 60 to provide clearance for a crank pin 61, on which is mounted a connecting rod 62, the opposite end of which is connected to the tool carrier 52, as by a screw 63. The function of the crank pin 61 and connecting rod 62 is to effect vertical reciprocation of the tool holder 52. The function of the eccentric strap 43 is to effect oscillation of the links 44, 45, about their fixed pivots, and through the links 50, 55, to effect lateral movement of the tool carrier during the vertical reciprocation thereof.

The arrangement of the crank pin 61 and eccentric 40, and the linkage described, is such as to effect forward movement of the tool carrier during its upward stroke, and rearward movement of the tool carrier during its downward stroke.

A suitable operating handle 70 is attached at its upper end to the gear housing, and at its lower end to the block 12. The gear housing 10 is formed with a flange 71 which, in conjunction with a closure plate 72, forms an enclosure for the operating mechanism.

The base plate 13 is formed with a slot 74 extending rearwardly from the front edge thereof to accommodate the saw blade 75 attached to the carrier 52, as by screw 76.

What I claim is:

1. A power operated elliptical motion tool comprising a casing, a power operated shaft journalled in said casing, a tool carrier, said shaft having a crank operatively connected to said tool carrier intermediate the ends thereof to effect reciprocation of said carrier in a direction radial of said shaft, a first pair of links arranged in tandem relation parallel to said tool carrier, each of said links being pivotally mounted intermediate its ends on a fixed support, a third link pivotally connected at one end to the adjacent ends of the links of said pair, a second pair of links disposed substantially perpendicular to said tool carrier and the links of said first pair, said second pair of links being pivotally connected at like ends to said tool carrier at opposite sides of said shaft and being pivotally connected at their opposite ends to the free ends of the links of said first pair, and means carried by said shaft and operable upon rotation thereof to effect reciprocation of said third link in a direction perpendicular to the movement of said tool carrier.

2. A power operated elliptical motion tool comprising a casing, a power operated shaft journalled in said casing and having a crank, a tool carrier operatively connected intermediate its ends with said crank whereby to effect reciprocation of the tool holder in a direction radial of the shaft upon rotation thereof, a first pair of links arranged in tandem relation parallel to said tool carrier, each of said links being pivotally mounted intermediate its ends on fixed supports, a third link pivotally connected at one end to the adjacent ends of the links of said pair and having its opposite end mounted on an eccentric carried by said shaft whereby the links of said first pair are oscillated about the pivot supports simultaneously with the reciprocation of said tool carrier, a second pair of links disposed substantially perpendicular to said tool carrier and the links of said first pair, said second pair of links being pivotally connected at like ends to said tool carrier at opposite sides of said shaft and being pivotally connected at their opposite end to the free ends of the links of said first pair.

3. A power operated elliptical motion tool as defined in claim 2, wherein said second pair of links constitute the sole support for said tool carrier.

References Cited in the file of this patent

UNITED STATES PATENTS

| | | |
|---|---|---|
| 264,473 | Nixon | Sept. 19, 1882 |
| 2,619,131 | Vulliet-Durand | Nov. 25, 1952 |